(12) United States Patent
Cheng et al.

(10) Patent No.: US 6,829,517 B2
(45) Date of Patent: Dec. 7, 2004

(54) COMPUTER SYSTEM FOR USE WITH LASER DRILLING SYSTEM

(75) Inventors: Chen-Hsiung Cheng, Chelmsford, MA (US); Xinbing Liu, Acton, MA (US)

(73) Assignee: Matsushita Electronic Industrial Co., Ltd., Osaka (JP)

( * ) Notice: Subject to any disclaimer, the term of this patent is extended or adjusted under 35 U.S.C. 154(b) by 0 days.

(21) Appl. No.: 10/267,035

(22) Filed: Oct. 8, 2002

(65) Prior Publication Data

US 2004/0019404 A1 Jan. 29, 2004

Related U.S. Application Data

(60) Provisional application No. 60/398,380, filed on Jul. 25, 2002.

(51) Int. Cl.[7] .............................................. G06F 19/00
(52) U.S. Cl. ...................................... 700/166; 700/173
(58) Field of Search ................................ 700/166, 173; 219/121.61, 121.62

(56) References Cited

U.S. PATENT DOCUMENTS

| | | | |
|---|---|---|---|
| 5,575,935 A | * 11/1996 | Nakata | 219/121.61 |
| 5,841,096 A | * 11/1998 | Takahashi et al. | 219/121.62 |
| 6,345,205 B1 | * 2/2002 | Inamasu et al. | 700/47 |
| 6,627,844 B2 | * 9/2003 | Liu et al. | 219/121.71 |
| 6,749,285 B2 | * 6/2004 | Liu et al. | 347/47 |
| 2001/0027354 A1 | * 10/2001 | Kakino et al. | 700/173 |
| 2002/0198622 A1 | * 12/2002 | Dinauer et al. | 700/166 |

* cited by examiner

*Primary Examiner*—Leo Picard
*Assistant Examiner*—Ryan A. Jarrett
(74) *Attorney, Agent, or Firm*—Harness, Dickey & Pierce, PLC

(57) ABSTRACT

A computer interface system for automated control of a laser drilling system has workpiece geometry template data defining a shape formed in a laser-milled workpiece. A user interface is receptive of a user selection characterizing a desired laser drilling operation. An expert system is adapted to receive the template data and the user selection, and is operable to adapt the template data to the user selection.

25 Claims, 5 Drawing Sheets

| WORKPIECE_ GEOMETRY_ ID | WP_ GEOMETRY_ NAME | DEPTH | ENTRY_ DIAMETER | EXIT_ DIAMETER | MATERIAL |
| --- | --- | --- | --- | --- | --- |
| 1 | CONCAVE CONE 1 | 50 | 80 | 20 | STAINLESS STEEL |
| 2 | CYLINDER 1 | 50 | 50 | 50 | CERAMIC |
| 3 | CONVEX CONE 2 | 50 | 75 | 25 | POLYMER |

FIG. 3A

| DRILLING_ POINT_ID | X_ COORDINATE | Y_ COORDINATE | TIME_TO_ MILL |
| --- | --- | --- | --- |
| 1 | 1 | 1 | 0 |
| 2 | 1 | 2 | 3 |
| 3 | 2 | 1 | 1 |

FIG. 3B

| DRILLING_ POINT_ID | X_ COORDINATE | Y_ COORDINATE | TIME_ TO_ MILL | PZT_X | PZT_Y |
| --- | --- | --- | --- | --- | --- |
| 1 | 1 | 1 | 0 | 40 | 40 |
| 2 | 1 | 2 | 3 | 40 | 80 |
| 3 | 2 | 1 | 1 | 80 | 40 |

FIG. 3C

COMPUTER SYSTEM FOR USE WITH LASER DRILLING SYSTEM

CROSS-REFERENCE TO RELATED APPLICATIONS

This application claims the benefit of U.S. Provisional Application Ser. No. 60/398,380 which was filed on Jul. 25, 2002 and is incorporated by reference herein.

FIELD OF THE INVENTION

The present invention generally relates to laser drilling and laser milling, and particularly relates to automated control of a laser drilling system using an end-product template defining a desired workpiece geometry and adapting the template to various combinations of workpiece material and laser characteristics.

BACKGROUND OF THE INVENTION

Material ablation by pulsed light sources has been studied since the invention of the laser. Reports in 1982 of polymers having been etched by ultraviolet (UV) excimer laser radiation stimulated widespread investigations of the process for micromachining. Since then, scientific and industrial research in this field has proliferated—mostly spurred by the remarkably small features that can be drilled, milled, and replicated through the use of lasers.

Ultrafast lasers generate intense laser pulses with durations from roughly $10^{-11}$ seconds (10 picoseconds) to $10^{-14}$ seconds (10 femtoseconds). Short pulse lasers generate intense laser pulses with durations from roughly $10^{-10}$ seconds (100 picoseconds) to $10^{-11}$ seconds (10 picoseconds). A wide variety of potential applications for ultrafast and short pulse lasers in medicine, chemistry, and communications are being developed and implemented. These lasers are also a useful tool for milling or drilling holes in a wide range of materials. Hole sizes as small as a few microns, even sub-microns, can readily be drilled. High aspect ratio holes can be drilled in hard materials, such as cooling channels in turbine blades, nozzles in ink-jet printers, or via holes in printed circuit boards.

Advanced laser drilling systems contain elements that maneuver the laser beam(s) and/or the workpiece(s) in a pattern such that the laser beam ablates the workpiece according to pre-determined geometry requirements. Computers can be programmed to rapidly perform the calculations required to guide precision drilling of a variety of shapes. Once these calculations are made for a given geometry, they can be executed in a repeatable manner for many workpieces. The coordinates calculated by laser milling algorithms are subsequently communicated to the elements of the laser drilling system to create the pre-determined geometry in the workpiece. Manually selecting laser drilling system parameters and making changes to those settings can be complex, and laser physicists are usually directly responsible for these activities.

Several problems arise that are associated with computer automated control of a laser drilling system. A first problem associated with computer automated control of a laser drilling system relates to providing a more marketable laser drilling system. Current laser drilling systems do not have an intuitive approach to select workpiece geometry, laser type, or workpiece material as required in a manufacturing environment. Having a way to streamline parameter input would increase the appeal, utility, and sales of laser drilling systems. What is needed is a way to provide a more marketable laser drilling system.

A second problem associated with computer automated control of a laser drilling system relates to decreasing the operating costs of a laser drilling system. Laser drilling systems utilize many complex elements and concepts to perform a specific task. Highly skilled laser physicists are often required to operate the laser drilling system because they understand the technical details of operating the laser drilling system, its elements, and the necessary input parameters. Employing high-salaried laser physicists that understand the technical details of the laser drilling system adds considerably to the operating costs of the laser drilling system. What is needed is a way to decrease the operating costs of a laser drilling system.

A third problem associated with computer automated control of a laser drilling system relates to facilitating the operation of a laser drilling system to create pre-determined geometries in mass manufacturing. Laser drilling systems can utilize a laser drilling system to create any number of complex shapes. In a mass-manufacturing environment, changes to the workpiece geometries necessary to create such complex shapes must be made quickly at the operator level. What is needed is a way to facilitate the operation of a laser drilling system to create pre-determined geometries in mass manufacturing.

SUMMARY OF THE INVENTION

According to the present invention, a computer interface system for automated control of a laser drilling system has workpiece geometry template data defining a shape formed in a laser-milled workpiece. A user interface is receptive of a user selection characterizing a desired laser drilling operation. An expert system is adapted to receive the template data and the user selection, and is operable to adapt the template data to the user selection.

Several differences exist between previous technology and the present invention. A first difference between the present invention and previous technology is that the present invention integrates together the material properties of the substrate to be drilled, hole geometry definition, drilling procedure control, and a laser drilling process. A second difference between the present invention and previous technology is that the present invention implements the combination of laser milling algorithms with a computer to drill specified workpiece geometry in a workpiece. A third difference between the present invention and previous technology is that the present invention provides a user-friendly interface to operate a laser drilling system, whereas previous technology does not. A fourth difference between the present invention and previous technology is that the present invention is that the present invention provides a simplified way to change workpiece geometry without requiring an operator's knowledge of laser drilling systems and laser-material interaction.

The present invention has several advantages over previous laser drilling systems. A first advantage of the present invention is that it provides a more marketable laser drilling system. A second advantage of the present invention is that it provides a way to decrease the operating costs of a laser drilling system. A third advantage of the present invention is that it facilitates the operation of a laser drilling system to create pre-determined geometries in mass manufacturing. A fourth advantage of the present invention is that it enables a layperson to operate a laser drilling system. A fifth advantage of the present invention is that it allows for expandability of parameters and a nearly infinite number of combinations of workpiece materials, workpiece geometry, and laser characteristics.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3A is an example of a workpiece geometry data table according to the present invention;

FIG. 3B is an example of a drilling data table according to the present invention;

FIG. 3C is an example of a drilling data table for use with a PZT scan mirror, wherein PZT_X and PZT_Y data is in millivolts;

DETAILED DESCRIPTION OF THE PREFERRED EMBODIMENTS

The following description of the preferred embodiment(s) is merely exemplary in nature and is in no way intended to limit the invention, its application, or uses.

Figure 1:
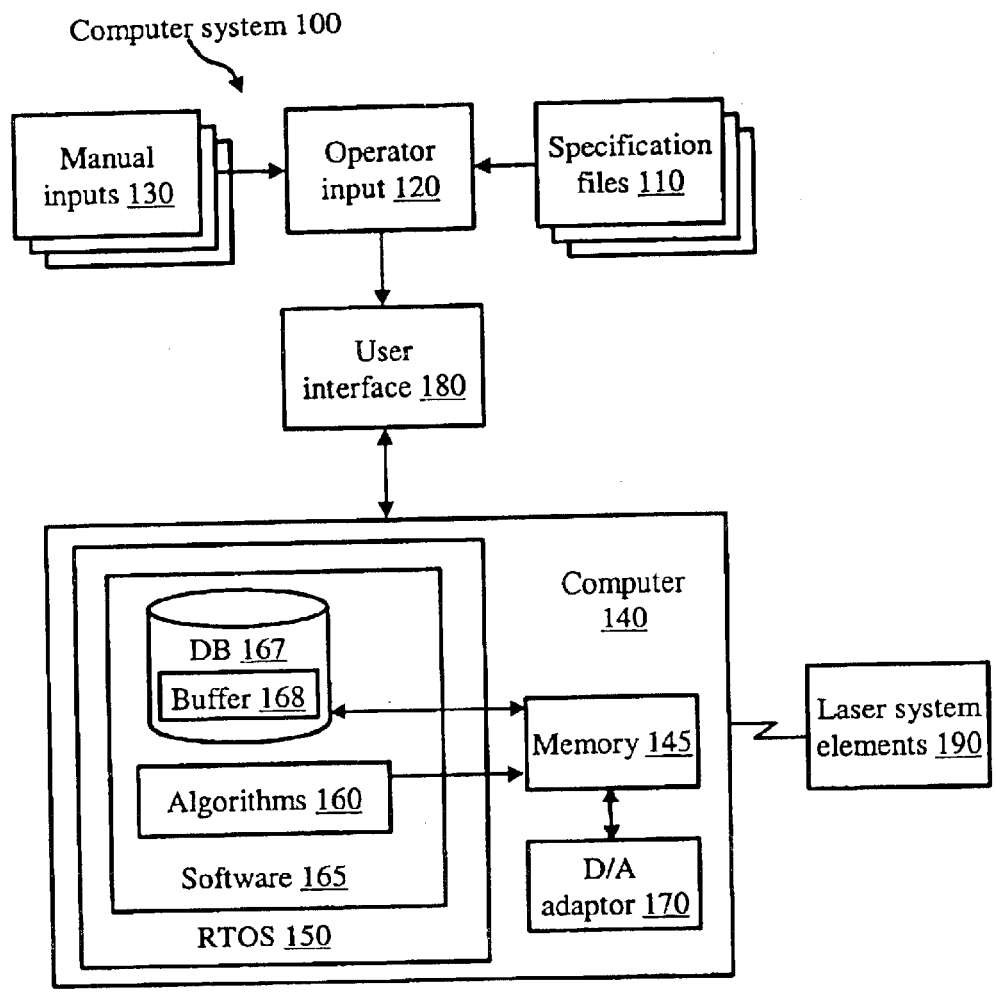
FIG. 1 is a block diagram of a computer system according to the present invention.

The present invention is a system that uses a computing means having a user-friendly interface to rapidly and easily implement tool path algorithms in a laser drilling system based upon changes in the workpiece geometry. FIG. 1 shows a computer system 100 to control a laser drilling system, with a means for operator input 120 through a user interface 180, one or more specification files 110, or manual inputs 130; a computer 140 with a memory 145, a real time operating system (RTOS) 150, one or more algorithms 160, software 165, a database (DB) 167 containing a buffer 168, and a digital-to-analog (D/A) adaptor 170; and laser system elements 190.

Operator input 120 consists of specific instructions from the laser drilling system operator regarding the geometry of the workpiece, the characteristics of the laser, and the physical characteristics of the workpiece. Input regarding the workpiece geometry, the laser, and the physical characteristics of the workpiece is achieved by importing specification files 110 or, alternatively, with manual inputs 130.

Specification files 110 contain data concerning the workpiece geometry. Specification files 110 may be in a variety of different file types, such as a database table, a CAD file, or a text file. To import specification files 110, a laser system operator is prompted by user interface 180 for the location and file type to be imported into computer 140. If the imported file is an acceptable file type, the data is converted to a database table and stored in DB 167.

The laser system operator enters manual inputs 130 as prompted by user interface 180, and these values are stored in DB 167. Manual inputs 130 serve as a replacement data source if no specification files 110 are available.

Computer 140 has a memory 145 that is random access memory. In one example, computer 140 has sufficient cache (not shown) and memory 145 to hold and send data to laser system elements 190 without creating a separate file. In an alternate example, directions for laser system elements 190 are stored in a file (not shown) stored on computer 140 and sent to laser system elements 190 when ready for transmission. Computer 140 has at least 200-MHz processor, Pentium II processor, 64 MB RAM.

RTOS 150 (e.g. Lynx, eCos) is a focused operating system that directs the resources of computer 140 towards the single task of controlling laser system elements 190. RTOS 150 is configured to be uninterrupted in controlling these elements. Without RTOS 150, interruptions to the management of software 165 and, subsequently, to laser drilling system elements 190 would cause uncontrollable lapses in data relay and result in products that contain defects and do not meet specifications.

Software 165 manages the operation of computer 140 for use in a laser drilling system. Software 165 controls: gathering inputs and running algorithms 160 prior to milling; accessing data from DB 167; sending data to D/A adaptor 170; and populating user interface 180. Software 165 may be written with any of a variety of programming languages, such as C/C++, Java, or COBOL.

Algorithms 160 consist of milling and correction algorithms to be used in controlling and defining the movements of laser system elements 190 required to achieve desired workpiece geometry, including the laser beam parameters, workpiece material characteristics, and variable inputs of workpiece geometry. Inputs are fed into algorithms 160, which are run by software 165. Algorithms 160 define the milling points on the X- and Y-axes, as well as the amount of time (T) to drill each milling point. In a specific example, the workpiece (not shown) is milled using a constant-exposure tool path algorithm that can be used to direct the movement of a piezo electric transducer (PZT) scan mirror in a laser drilling system to produce tapered holes in a consistent, repeatable process. In another example, correction algorithms are also used to compensate for hysteresis and reflection geometry issues in using a PZT scan mirror to direct a laser upon a workpiece.

DB 167 is a database management system containing ordered and structured data to be used by software 165 to calculate and control a laser drilling system. Those inputs from user interface 180 that do not match the pre-existing geometry in DB 167 are stored in DB 167 as new entries for future use. DB 167 stores a set of pre-defined workpiece geometries in the form of data tables as illustrated below. Stacking a few different pre-defined shapes in a proper sequence also can produce composite geometries. DB 167 further stores relevant laser material interaction data, such as ablation rates for various materials. DB 167 also contains buffer 168 for the storage of data that drives laser system elements. Data storage and recall within DB 167 is completed with conventional database management system processes and rules, such as those available from Oracle Corporation.

Figure 2:
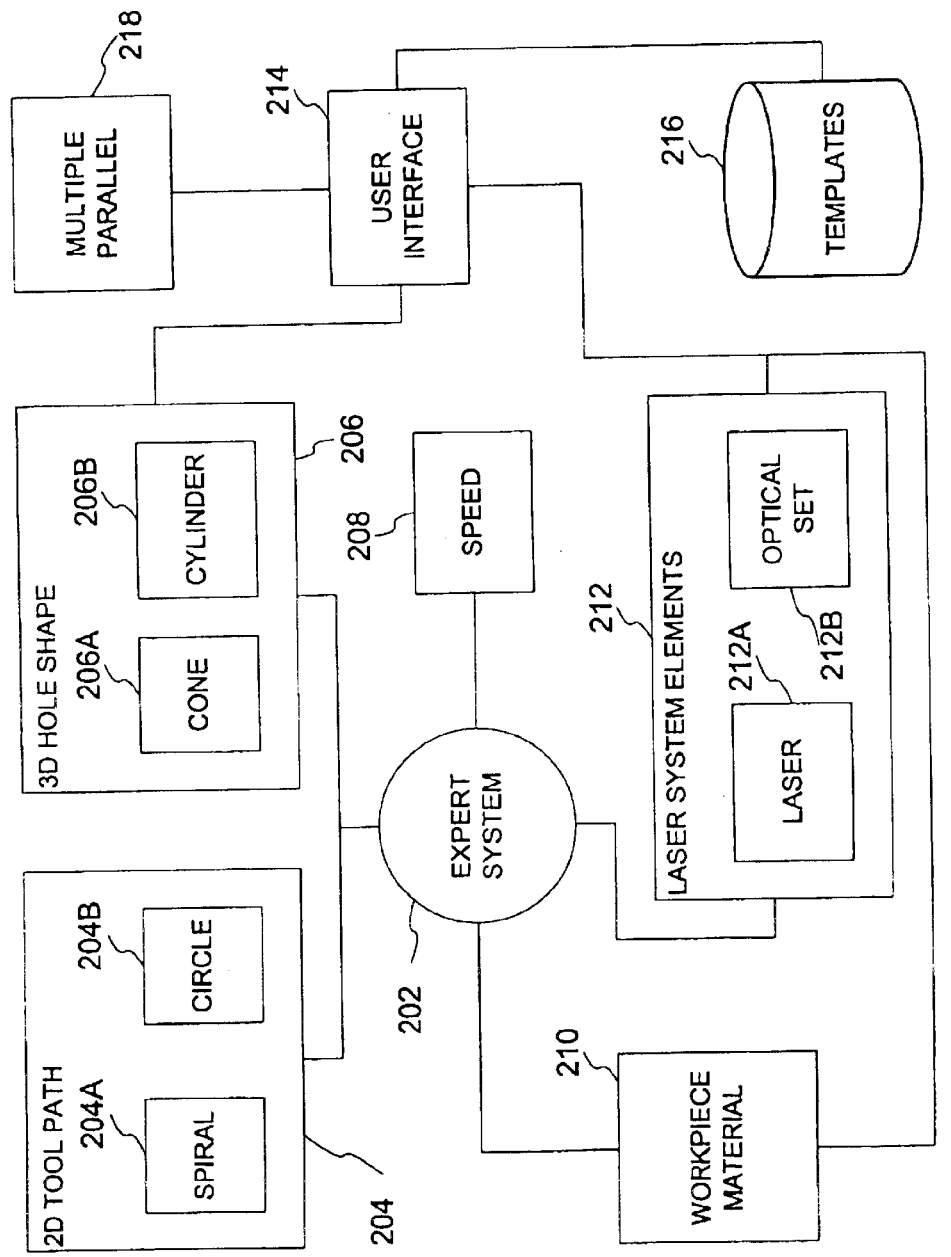
FIG. 2 is a block diagram of a software system according to the present invention.

Referring to FIG. 2, a software system 200 according to the present invention has an expert system 202 operable to control a laser drilling system to mill shapes in a workpiece. Accordingly, the expert system 202 has access to two-dimensional tool path algorithms 204, such as spiral path algorithm 204A and circular path algorithm 204B. Expert system 202 further has access to three-dimensional hole shape algorithms 206, such as cone shape algorithm 206A and cylinder shape algorithm 206B. These algorithms interact to achieve a desired shape in a milled workpiece.

A desired shape is milled in a workpiece by interaction of algorithms 204 and 206. For example, where algorithms 204 operate to ablate a layer of substantially uniform depth, algorithms 206 can recursively ablate successive layers of workpiece material while altering an outer perimeter of each successive layer to achieve the desired shape. Thus, algorithms 206 can achieve a desired shape using algorithms 204 based on arguments such as entry diameter, exit diameter, and depth, wherein the entry diameter is at least as large as the exit diameter.

Expert system 202 has the ability to adapt the algorithms 204 and 206. For example, expert system 202 has the ability to vary the algorithms by running them at different speeds as at 208 for different workpiece materials as at 210. Thus, a softer workpiece material with a faster ablation rate may be milled with a tool path that runs at a faster rate than with a harder material. Further, if the depth of layer ablation changes due to a change in ablation rate of workpiece material, expert system 202 can adapt algorithms 206 by ablating more or less layers as appropriate and varying alteration of the outer perimeter of each successive layer accordingly. Still further, expert system has the ability to vary the algorithms 204 and 206 for different laser characteristics 212 according to a change in ablation rate of workpiece material as described above. Further still, expert system 202 can select from a plurality of lasers 212A and/or optical sets 212B according to compatibility of the laser characteristics 212 with workpiece material as at 210. Thus, expert system 202 may select a faster laser with a lower intensity for a softer workpiece material so as to keep the ablation rate within acceptable limits for achieving the desired shape in the finished workpiece.

In accordance with the present invention, expert system 202 has a user interface 214 that permits a user to input and/or select a template 216 for achieving a customer-specified shape (workpiece geometry) in a finished workpiece. These templates 216 contain previously stored end product data and may be configured via manual input and/or downloaded from a disk and/or online. Thus, end product data can be developed by experts and/or by a user or customer via a computer automated wizard for defining a desired end product. In accordance with the previous examples, a template for a desired shape contains one or more shapes in a predefined order and spatial relationship. For example, a template for an ink-jet nozzle may have a cylinder of customer-specified depth and diameter pre-drilling an exit hole, followed by a cone describing a customer-specified half-angle through the workpiece material to effect a desired contour between an upper surface of the workpiece material and the inner walls of the cylinder.

Further in accordance with the present invention, user interface 214 permits a user to input and/or select to drill multiple workpiece geometries in parallel as at 218, and this functionality corresponds to selection of an optical set 212B by the user. Thus, a user can input a template 216 for an inkjet nozzle and select an optical set 212B having a Diffractive Optical Element (DOE) and microfilter that drills a nine by nine matrix of inkjet nozzles in parallel. The user can further select to use a pico-second laser 212A to mill the nine by nine matrix of ink jet nozzles in a selected stainless steel workpiece material 210. Accordingly, expert system 202 controls the laser drilling system to drill the inkjet nozzle with the selected laser, DOE, and microfilter in the stainless steel.

In a preferred embodiment, combinations of selections that are known to be incompatible will prevent operation of the systems under those combinations of parameters. Accordingly, expert system 202 can make only those laser characteristics and/or workpiece materials available for selection that are not incompatible with selections already made. For example, if a user chooses to drill a nine by nine matrix of inkjet nozzles in parallel in stainless steel, expert system 202 can make only those lasers 212A and optical sets 212B available for selection to the user. Thus, expert system 212 has the ability to prevent an incompatible combination of selections from being made, and feedback from results of drilling attempts can be used to expand the sets of known compatible and/or incompatible combinations of selections. These sets can also be updated on a regular basis via feedback on a network of multiple drilling systems.

Tables 1 and 2, as respectively exemplified in FIGS. 3A and 3B, are examples of the types of data stored in DB 167. The content of DB 167 is not limited to the tables shown, nor are the fields within those tables limited to those shown in Tables 1 and 2. These tables are shown as simplified examples to increase understanding of the content of DB 167 and its role and purpose within computer system 100.

Referring to FIG. 3A, Table 1 shows an example of a table structure and exemplary data stored to define workpiece geometries. workpiece_geo_id can be selected by a user either by either manual inputs 130 or specification files 110 via operator input 120. A new row with new workpiece_geo_id will be added when a new geometry is inquired.

Each row in Table 1 represents a specific workpiece geometry to be drilled with a laser drilling system. Each row contains the critical measurements for each of the workpiece geometries in the table.

Within Table 1, workpiece_geo_id is a database key defining the specific combination of all the other fields in Table 1. Workpiece_geo_name is text name of the workpiece geometry being defined in each row. Depth is the distance in the Z direction in $\mu$m from the reference point of the workpiece to the exit hole. Entry_diameter is the distance in $\mu$m across the entry side of the hole being drilled. Exit_diameter is the distance in $\mu$m across the exit side of the hole being drilled.

Referring to FIG. 3B, Table 2 shows an example of a table structure and exemplary data sent to laser system elements 190. Table 2 contains the following fields: drilling_point_id, X_coordinate, Y_coordinate, and time_to_mill.

Each row in Table 2 represents one point to be drilled with a laser drilling system. To drill an entire workpiece geometry, many thousands of points (rows from Table 2) are drilled in a workpiece, and the end result of these thousands of drilled points will be the defined workpiece geometry.

Within Table 2, drilling_point_id is a database key defining the specific combination of all the other fields in Table 2. X_coordinate is the distance in the X direction in $\mu$m from the reference point of the workpiece. Y_coordinate is the distance in the Y direction in $\mu$m from the reference point of the workpiece. Time_to_mill is the length of time in milliseconds that the laser should drill at the specific point.

Further calculations need to be completed before data is sent to laser system elements 190. In one example where a PZT scan mirror is used to guide the drilling beam in a laser drilling system, the data that goes to the PZT scan mirror controller is simply voltages to control the X-Y translation of the drilling beam from the PZT scan mirror.

Referring to Table 3C, Table 3 includes all fields from Table 2 and additional fields, including PZT_X and PZT_Y in millivolt. In one example where computer system 100 is sending information to a PZT scan mirror controller, PZT_X and PZT_Y provide information to the PZT scan mirror to guide the drilling laser beam in the X-, Y-axes.

D/A adaptor 170 is a digital-to-analog adaptor that converts digital information resulting from algorithms 160 into voltages that are sent to laser system elements 190. If laser system elements 190 have their own digital-to-analog adaptor function, D/A adaptor 170 is removed from computer 140. In this case, laser system elements 190 accept the digital information directly from computer 140.

User interface 180 provides a way for a system operator to efficiently use computer 140. User interface 180 is displayed on a monitor (not shown) attached to computer 140, and displays prompts to direct the operator to input a workpiece geometry in three different ways. A specification file 110 from a third party can be chosen. Alternatively, the operator can select one of the existing geometries from DB 167. For unusual geometry, a composite of existing geometries, or strictly manual inputs, can also be accommodated. In one example, user interface 180 includes menu-driven screens that provide a way to select the workpiece geometry to be drilled, import new workpiece geometries, and begin the laser drilling process. The operator can also initiate repetitive processing in order to continuously machine identical jobs without human intervention. Furthermore, a programmed schedule will be setup if the geometries vary from piece to piece in a streamlined process of a few jobs.

Laser system elements 190 are elements within a laser drilling system (not shown) that control the drilling process. Examples of elements included in laser system elements 190 include galvanometers, PZT scan mirrors, and moveable workpiece stages.

In operation, computer system 100's only task is to control a laser drilling system. RTOS 150 runs at a steady state awaiting operator input 120. When a laser system operator provides operator input 120, software 165 starts user interface 180, and user interface 180 prompts the operator to select an existing workpiece geometry stored in DB 167. The laser system operator can select or compose the workpiece geometry to be drilled from a list of stored values in DB 167. Milling information and algorithms 160 that are specific to the workpiece geometry selected are sent to memory 145 from DB 167. Software 165 calls on and executes algorithms 160. Algorithms 160 then generate a drilling data set that defines every milling point, the corresponding voltages required to direct laser system elements 190, and the sequence in which the points are to be drilled. Software 165, operating within RTOS 150, sends the data set to buffer 168 within DB 167 and memory 145. Data specific to each point to be milled by laser drilling system, the voltages, and the sequence are extracted from memory 145 by software 165 and sent to D/A adaptor 170. D/A adaptor 170 converts data to analog voltages required to maneuver laser system elements 190. Laser system elements 190 drill the specified geometry in the workpiece. Consecutive or repetitive drilling will be performed if the process is selected and setup. Buffer 168 is cleared from DB 167 and RTOS 150 returns to a steady state awaiting operator input 120.

Alternatively, if the laser system operator is drilling a workpiece geometry for which data sets are not stored in DB 167, manual entry of new workpiece geometries is possible. User interface 180 contains an option to load new workpiece geometries into database for subsequent drilling. Loading new workpiece geometries is accomplished with specification files 110 or manual inputs 130. After the new workpiece geometries are loaded, operation proceeds as described in the paragraph above.

In either case, the use of computer system 100 greatly streamlines and simplifies the operation of a laser drilling system.

A nozzle plate of an ink-jet head may be constructed with the laser drilling system of the present invention as further detailed below.

Figure 4:
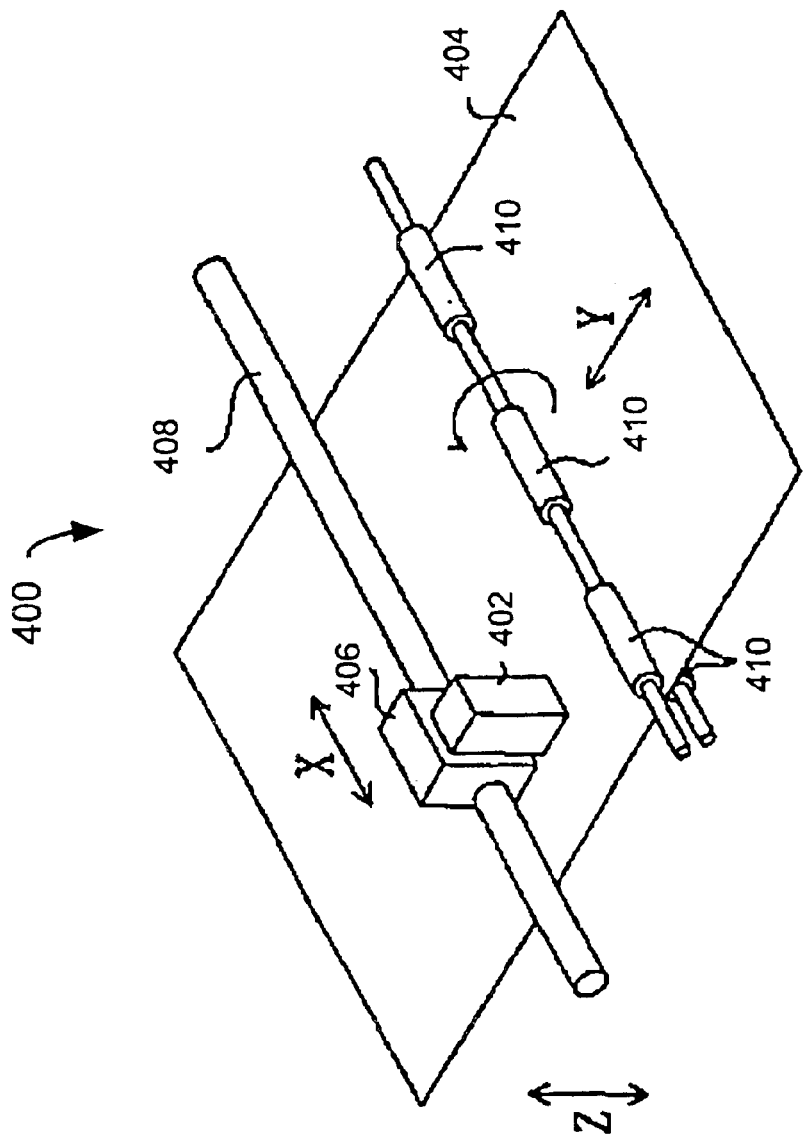
FIG. 4 is a perspective view showing major constituent components of an ink-jet printer.

As shown in FIG. 4, an ink-jet printer 400 has an ink-jet head 402 capable of recording on a recording medium 404 via a pressure generator. Ink droplets emitted from the ink-jet head 402 are deposited on the recording medium 404, such as a sheet of copy paper, so that recording can be performed on the recording medium 404.

The ink-jet head 402 is mounted on a carriage 406 capable of reciprocating movement along a carriage shaft 408. More specifically, the ink-jet head 402 is structured such that it can reciprocate in a primary scanning direction X in parallel with the carriage shaft 408.

The recording medium 404 is timely conveyed by rollers 410 in a secondary scanning direction Y.

The ink-jet head 402 and the recording medium 404 are relatively moved by the rollers 410.

Figure 5:
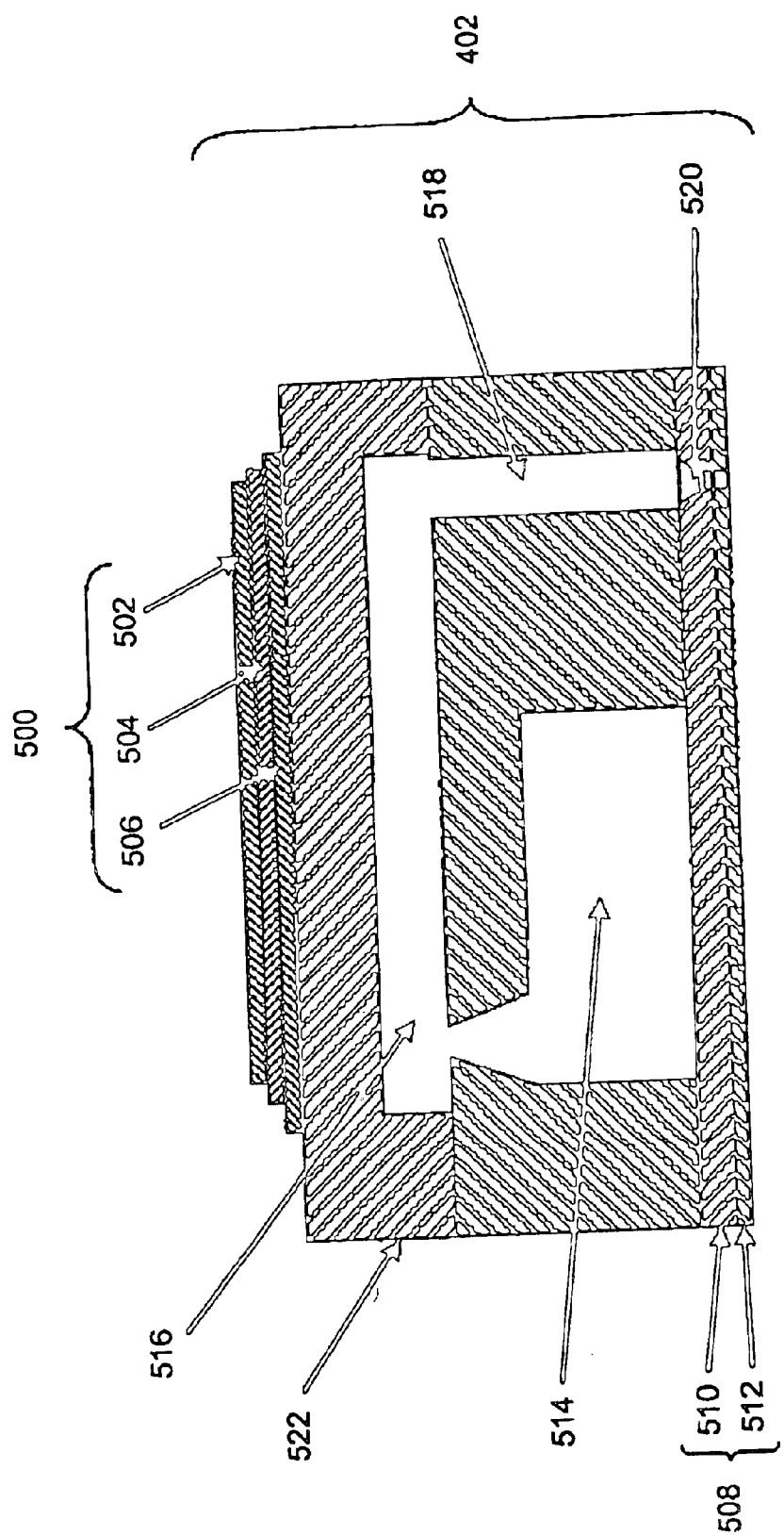
FIG. 5 is a schematic cross-sectional view of an ink-jet head.

Referring to FIG. 5, a pressure generator 500 is preferably a piezoelectric system, a thermal system, and/or equivalent system. In this embodiment, the pressure generator 500 corresponds to a piezoelectric system which comprises an upper electrode 502, a piezoelectric element 504, and an under electrode 506.

A nozzle plate 508 comprises a nozzle substrate 510 and a water repellent layer 512. The nozzle substrate 510 is made of metal, resin, and/or equivalent material. The water repellant layer 512 is made, for example, of fluororesin or silicone resin. In this embodiment, the nozzle substrate 510 is made of stainless steel and has a thickness of 50 um, and the water repellent layer 512 is made of a fluororesin and has a thickness of 0.1 um.

The ink-jet ink is filled in an ink supplying passage 514, a pressure chamber 516, an ink passage 518, and a nozzle 520.

Ink droplets are ejected from the nozzle 520 as the pressure generator 700 pushes the pressure chamber element 520.

As a result of the present invention, very good nozzles are formed without flash and foreign matter (carbon etc) in the nozzle plate. Further, the accuracy of the nozzle outlet diameter is 20 um±1.5 um.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A computer interface system for automated control of a laser drilling system, the computer interface system comprising:

a memory for storing a set of tool path algorithms including at least one two-dimensional tool path algorithm and at least one three-dimensional tool path algorithm, said at least one two-dimensional and at least one three-dimensional tool path algorithms being interactively operable to define a desired shape;

workpiece geometry template data defining a shape formed in a laser-milled workpiece;

a user interface receptive of a user selection characterizing a desired laser drilling operation in terms of at least one of workpiece material, laser type, and optical set; and an expert system adapted to receive the template data and the user selection, and operable to adapt said at least one two-dimensional and at least one three-dimensional tool path algorithms to the user selection, wherein the algorithms are operable to perform a laser milling operation in accordance with the template data by recursively ablating successive, two-dimensional layers of workpiece material of substantially uniform depth while altering an outer perimeter of each successive layer to achieve a three-dimensional shape defined by the workpiece geometry template data.

2. The system of claim 1, wherein the user selection relates to laser characteristics.

3. The system of claim 2, wherein the laser characteristics include a choice of an optical set operable to drill multiple holes in parallel according to the workpiece geometry template.

4. The system of claim 1, wherein the user selection relates to workpiece material.

5. The system of claim 1, wherein the user interface is receptive of said workpiece geometry template.

6. The system of claim 1, wherein the user interface is receptive of user input operable to define a workpiece geometry template.

7. The system of claim 1, comprising algorithms for drilling predefined shapes in a workpiece, wherein said expert system is operable to adapt said algorithms to a user selected workpiece material and a user selected set of laser characteristics.

8. The system of claim 7, wherein said algorithms comprise two-dimensional tool path algorithms and three-dimensional hole shape algorithms operable to implement said two-dimensional tool path algorithms to achieve the desired shape in the workpiece based on a plurality of arguments and form a tapered hole by ablation of successive layers of uniform depth and successively reducing area.

9. The system of claim 8, wherein said workpiece geometry template comprises the plurality of arguments.

10. The system of claim 9, wherein the plurality of arguments comprises an entry diameter, an exit diameter, and a depth.

11. The system of claim 1 wherein the laser-milled workpiece is further defined as a nozzle plate for an ink-jet head.

12. The system of claim 1, wherein the template data stacks plural pre-defined shapes in a predefined sequence and spatial relationship to produce a composite geometry.

13. The system of claim 1, wherein said expert system is adapted to vary the algorithms by running them at different speeds for different workpiece materials.

14. The system of claim 1, wherein said expert system is adapted to vary the algorithms by ablating more or less layers and by varying alteration of the outer perimeter of each successive layer according to changes in ablation rate of workpiece material.

15. A computer-implemented interfacing method for use with a computer automated laser drilling system, comprising:

storing a set of tool path algorithms including at least one two-dimensional tool path algorithm and at least one three-dimensional tool path algorithm, said at least one two-dimensional and at least one three-dimensional tool path algorithms being interactively operable to define a desired shape;

receiving workpiece geometry template data defining a shape formed in a laser-milled workpiece;

receiving a user selection characterizing a desired laser drilling operation in terms of at least one of workpiece material, laser type, and optical set; and adapting said two-dimensional and three-dimensional tool path algorithms based on the user selection, wherein the algorithms are operable to perform a laser milling operation in accordance with the template data by recursively ablating successive, two-dimensional layers of workpiece material of substantially uniform depth while altering an outer perimeter of each successive layer to achieve a three-dimensional shape defined by the workpiece geometry template data.

16. The computer-implemented method of claim 15, wherein said receiving a user selection corresponds to receiving a user selection relating to laser characteristics.

17. The computer-implemented method of claim 15, wherein said receiving a user selection corresponds to receiving a user selection relating to a choice of an optical set operable to drill multiple holes in parallel according to the workpiece geometry template.

18. The computer-implemented method of claim 15, wherein said receiving a user selection corresponds to receiving a user selection relating to workpiece material.

19. The computer-implemented method of claim 15, comprising implementing algorithms for drilling shapes in a workpiece.

20. The computer-implemented method of claim 15, comprising adapting said algorithms to a user selected workpiece material and a user selected set of laser characteristics.

21. The computer-implemented method of claim 20, wherein said algorithms comprise two-dimensional tool path algorithms and three-dimensional hole shape algorithms, wherein said implementing corresponds to:

passing a set of arguments to the three-dimensional hole shape algorithm;

implementing the two-dimensional tool path algorithm to ablate a first layer of a workpiece; and adjusting implementation of the two-dimensional tool path algorithm according to the set of arguments for a successive ablation to form a tapered hole by ablation of successive layers of uniform depth and successively reducing area.

22. The computer-implemented method of claim 21, wherein said workpiece geometry template comprises the arguments.

23. The computer-implemented method of claim 22, wherein said receiving a workpiece geometry template corresponds to receiving a plurality of arguments comprising an entry diameter, an exit diameter, and a depth.

24. The computer-implemented method of claim 22, wherein said receiving a workpiece geometry template corresponds to receiving multiple sets of arguments in an order defined to accomplish a sequence of stacked, pre-defined shapes operable to produce a composite geometry.

25. The computer-implemented method of claim 15, wherein the laser-milled workpiece is further defined as a nozzle plate for an ink-jet head.

* * * * *